(12) United States Patent
Nozawa (10) Patent No.: US 10,906,415 B2
(45) Date of Patent: Feb. 2, 2021

(54) POWER SOURCE SYSTEM FOR VEHICLE (71) Applicant: TOYOTA JIDOSHA KABUSHIKI KAISHA, Toyota (JP)

(72) Inventor: Takashi Nozawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 174 days.

(21) Appl. No.: 16/165,127

(22) Filed: Oct. 19, 2018

(65) Prior Publication Data
US 2019/0135119 A1    May 9, 2019

(30) Foreign Application Priority Data

Nov. 8, 2017  (JP) .................................. 2017-215722

(51) Int. Cl.
| B60L 1/00 | (2006.01) |
| B60L 3/00 | (2019.01) |
| B60L 53/24 | (2019.01) |
| H02M 3/158 | (2006.01) |
| H02M 1/00 | (2006.01) |
| H02P 27/06 | (2006.01) |

(52) U.S. Cl.
CPC ............. B60L 53/24 (2019.02); H02M 3/158 (2013.01); *B60L 2210/14* (2013.01); *H02M 2001/007* (2013.01); *H02P 27/06* (2013.01); *H02P 2201/07* (2013.01)

(58) Field of Classification Search
CPC ...... B60L 53/24; B60L 2210/14; H02P 27/06; H02P 2201/07; H02M 3/158; H02M 2001/007
See application file for complete search history.

(56) References Cited

U.S. PATENT DOCUMENTS

| 2009/0108674 A1* | 4/2009 | Ozaki ................... B60L 3/0046 |
| | | 307/10.6 |
| 2016/0236581 A1* | 8/2016 | Tashiro .................. H01M 10/48 |
| 2017/0113567 A1* | 4/2017 | Koketsu .................. B60L 50/13 |
| 2018/0105058 A1* | 4/2018 | Symanow ........... B60L 11/1862 |
| 2018/0354386 A1* | 12/2018 | Lee ...................... B60L 11/1862 |

FOREIGN PATENT DOCUMENTS

| JP | 2016-123149 A | 7/2016 |
| JP | 2016-135010 A | 7/2016 |
| JP | 2017-085810 A | 5/2017 |

* cited by examiner

Primary Examiner — Rexford N Barnie
Assistant Examiner — Rasem Mourad
(74) Attorney, Agent, or Firm — Oliff PLC (57) ABSTRACT

A power source system may include a main power source, a power converter including a capacitor, a relay configured to switch between connection and disconnection between the power converter and the main power source, an auxiliary power source, a boost converter having a low voltage terminal thereof connected to the auxiliary power source, and having a high voltage terminal thereof connected to the power converter without interposing the relay, and a controller configured to pre-charge the capacitor prior to placing the relay in a connected state. The controller may be configured to specify a relationship between a voltage and a current of the auxiliary power source based on data of chronological changes of the voltage and the current of the auxiliary power source, and control the boost converter based on the relationship such that a voltage of the auxiliary power source does not fall below a predetermined voltage threshold.

2 Claims, 7 Drawing Sheets

POWER SOURCE SYSTEM FOR VEHICLE

CROSS-REFERENCE TO RELATED APPLICATION

This application claims priority to Japanese Patent Application No. 2017-215722 filed on Nov. 8, 2017, the contents of which are hereby incorporated by reference into the present application.

TECHNICAL FIELD

The technology disclosed herein relates to a power source system for a vehicle, and particularly relates to a power source system for a vehicle that includes a high voltage power source for a traction motor and a low voltage power source for an auxiliary device.

BACKGROUND

An electric vehicle (including a fuel-cell vehicle and a hybrid vehicle) includes a high voltage power source (a main power source) for a traction motor and a low voltage power source (an auxiliary power source) for an auxiliary device. The "auxiliary device" is a generic term for vehicle-mounted devices that have an operating voltage lower than a voltage of the traction motor. The operating voltage of the vehicle-mounted devices is equal to or lower than approximately 50 volts. The traction motor has a driving voltage higher than 100 volts, and the main power source has an output voltage exceeding 100 volts. In other words, the auxiliary power source has an output voltage lower than the output voltage of the main power source. Typical examples of the main power source are a lithium-ion battery and a fuel cell. A secondary battery, which is rechargeable, is adopted as the auxiliary power source. A typical example of the auxiliary power source is a lead battery. Japanese Patent Application Publication No. 2017-085810, Japanese Patent Application Publication No. 2016-135010, and Japanese Patent Application Publication No. 2016-123149 illustrate such power source systems.

The main power source is connected to a power converter via a system main relay. The power converter converts power from the main power source into driving power of the traction motor. The power converter includes a capacitor connected between a positive electrode and a negative electrode of the main power source. The capacitor is provided for smoothing a current supplied from the main power source or for temporarily storing power energy in a chopper-type voltage converter. When the system main relay is switched from an open state to a connected state and the power converter is connected to the high voltage power source at turn-on of a main switch of the vehicle, a large current flows into the capacitor through the system main relay. The surge of the large current may cause contact melting in the system main relay. In this respect, in the power source system in each of Japanese Patent Application Publication No. 2017-085810 and Japanese Patent Application Publication No. 2016-135010, the capacitor is charged by using an auxiliary battery prior to switching the system main relay to the connected state. Charging the capacitor before switching the system main relay to the connected state is referred to as pre-charging.

The power source system in each of Japanese Patent Application Publication No. 2017-085810, Japanese Patent Application Publication No. 2016-135010, and Japanese Patent Application Publication No. 2016-123149 includes a boost converter having a low voltage terminal thereof connected to the auxiliary power source and a high voltage terminal thereof connected to the power converter without interposing the system main relay. A controller of the power source system pre-charges the capacitor with power from the auxiliary power source by operating the boost converter prior to switching the system main relay to the connected state.

To ensure execution of the pre-charging even in a case where a remaining amount in the auxiliary power source is small, the power source system in Japanese Patent Application Publication No. 2016-135010 activates only an auxiliary device required for the pre-charging, while prohibiting activation of another auxiliary device.

SUMMARY

It is desirable that the pre-charging before the system main relay is switched to the connected state is completed within a shortest time possible. To do so, it is desirable that an output of the boost converter (i.e., a consumption current of the boost converter) is large. Meanwhile, the auxiliary power source supplies power to various auxiliary devices. An air conditioner, a room lamp, a car navigation system as well as various kinds of controllers including a controller of a power source system belong to auxiliary devices, and are supplied with power from the auxiliary power source. Some of the auxiliary devices are operating at the pre-charging in some cases and consume power from the auxiliary power source. If the boost converter also starts operating while some of the auxiliary devices are operating, power from the auxiliary power source may become insufficient and a voltage of the auxiliary power source may decrease, which may result in unstable operations of other auxiliary devices. The disclosure herein provides a power source system for a vehicle capable of stably executing pre-charging by using an auxiliary power source to which various auxiliary devices are connected.

A power source system for a vehicle disclosed herein may comprise a main power source, an auxiliary power source, a power converter, a relay, a boost converter, and a controller. The power converter may be configured to convert output power from the main power source and include a capacitor connected between a positive electrode and a negative electrode of the main power source. The relay may be configured to switch between connection and disconnection between the power converter and the main power source. The auxiliary power source may have an output voltage lower than an output voltage of the main power source. The boost converter may have a low voltage terminal thereof connected to the auxiliary power source and have a high voltage terminal thereof connected to the power converter without interposing the relay. The controller may be configured to pre-charge the capacitor by activating the boost converter prior to placing the relay in a connected state and connecting the power converter to the main power source. The controller may be configured to acquire data of chronological changes of a voltage and a current of the auxiliary power source and specify a relationship between the voltage and the current of the auxiliary power source based on the data. The controller may be configured to control the boost converter based on the relationship such that a voltage of the auxiliary power source does not fall below a predetermined voltage threshold. The voltage threshold is set to a lower limit value (or a value acquired by adding a margin to the lower limit value) of voltage with which auxiliary device(s) connected to the auxiliary power source can stably operate.

The power source system disclosed herein specifies the relationship between the voltage and the current of the auxiliary power source and controls the boost converter by using the relationship. Therefore, this power source system can control the boost converter at a highest output possible without allowing the voltage of the auxiliary power source to fall below the voltage threshold. In other words, this power source system can complete the pre-charging within a short time without allowing the voltage of the auxiliary power source to fall below the voltage threshold. The power source system disclosed herein can stably execute the pre-charging by using the auxiliary power source to which various auxiliary devices are connected.

Details and further improvements of the technology disclosed herein will be described in "DETAILED DESCRIPTION" below.

DETAILED DESCRIPTION

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved power supply system for a vehicle, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 1:
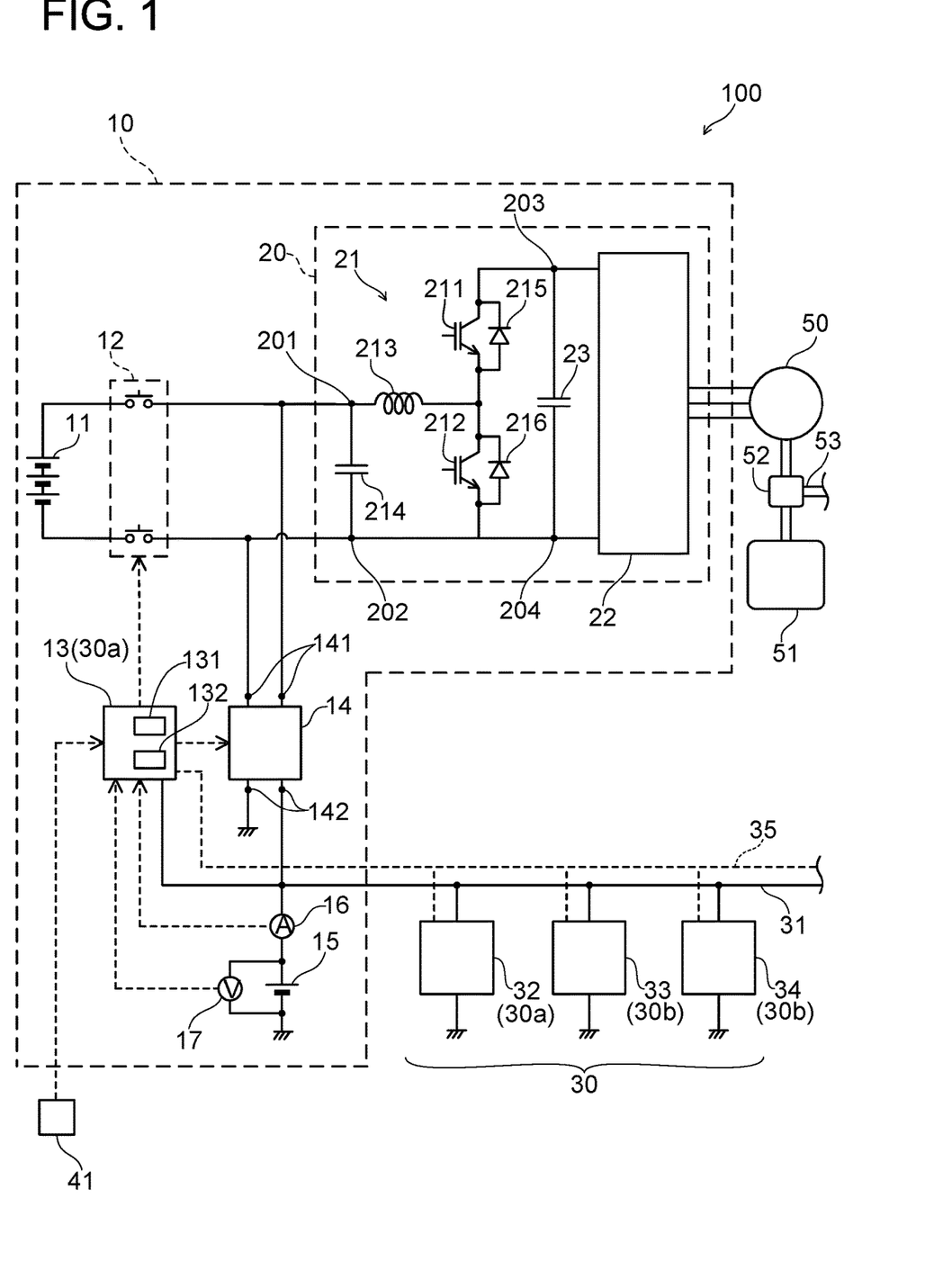
FIG. 1 is a block diagram of a power system of a hybrid vehicle that includes a power source system of an embodiment.

With reference to the drawings, a power source system 10 of an embodiment will be described. The power source system 10 of the embodiment is mounted on a hybrid vehicle 100. FIG. 1 illustrates a block diagram of a power system of the hybrid vehicle 100 that includes the power source system 10. The hybrid vehicle 100 includes a traction motor 50 and an engine 51. An output torque of the traction motor 50 and an output torque of the engine 51 are combined at a gear set 52 and transferred to an axle 53.

The hybrid vehicle 100 includes a main switch 41, an engine controller 32, an air conditioner 33, and a car navigation system 34, in addition to the power source system 10, the traction motor 50, and the engine 51. The engine controller 32, the air conditioner 33, and the car navigation system 34 are supplied with power from an auxiliary battery 15 through an auxiliary power line 31. A controller 13 included in the power source system 10 is also supplied with power from the auxiliary battery 15, which will be described in detail later. Devices supplied with power from the auxiliary battery 15 are collectively called "auxiliary devices". Hereinbelow, auxiliary devices such as the engine controller 32, the air conditioner 33, the car navigation system 34, and the controller 13 may be collectively called auxiliary devices 30. The auxiliary devices 30 are classified into special auxiliary devices 30a and normal auxiliary devices 30b. The classification will be described later.

The power source system 10 is a system that supplies power to the traction motor 50 and the auxiliary devices 30. The power source system 10 includes a main battery 11, the auxiliary battery 15, a system main relay 12, a power converter 20, a boost converter 14, and the controller 13.

The main battery 11 is a power source mainly for the traction motor 50. The main battery 11 is, for example, a rechargeable lithium-ion battery. The main battery 11 has an output voltage of, for example, 200 volts.

As mentioned above, the auxiliary battery 15 is a power source for supplying power to the auxiliary devices 30. The auxiliary battery 15 has an output voltage that is lower than the output voltage of the main battery 11, and the output voltage of the auxiliary battery 15 is, for example, 12 volts, 24 volts, or 48 volts. The auxiliary battery 15 is also a secondary battery, which is rechargeable, and is, for example, a lead battery. The auxiliary battery 15 supplies power to a large number of auxiliary devices, which are not illustrated, via the auxiliary power line 31 that runs throughout the vehicle. A negative electrode of the auxiliary battery 15 and negative electrodes of the auxiliary devices 30 are connected via a ground. In an auxiliary power system, a body of the vehicle corresponds to a ground terminal.

The power converter 20 is connected to the main battery 11 via the system main relay 12. The power converter 20 converts output power from the main battery 11 into driving power of the traction motor 50. The power converter 20 includes a bidirectional DC-DC converter circuit 21, an inverter circuit 22, and a capacitor 23. The traction motor 50 has a driving voltage between 200 volts and 600 volts. If a driving voltage target of the traction motor 50 is higher than the output voltage of the main battery 11, the bidirectional DC-DC converter circuit 21 boosts the output voltage of the main battery 11 to the driving voltage of the traction motor 50. The inverter circuit 22 converts the boosted direct-current power into alternating-current power for driving the traction motor 50. For convenience of description, the bidirectional DC-DC converter circuit 21 will hereinafter simply be referred to as the bidirectional converter circuit 21.

The traction motor 50 generates power by utilizing an inertial force of the vehicle when a driver presses a brake pedal. The power generated by the traction motor 50 is referred to as regenerative power. The inverter circuit 22 can also convert alternating-current regenerative power into direct-current power, and transmit it to the bidirectional converter circuit 21. The bidirectional converter circuit 21 steps down the regenerative power, which has been converted into the direct-current power, to the voltage of the main battery 11, The main battery 11 is charged with the stepped-down regenerative power.

A circuit configuration of the bidirectional converter circuit 21 will be described. The bidirectional converter circuit 21 is constituted of two transistors 211, 212, two diodes 215, 216, a reactor 213, and a capacitor 214. The two transistors 211, 212 are connected in series between inverter-side terminals (a positive electrode terminal 203 and a negative electrode terminal 204) of the bidirectional converter circuit 21. The diode 215 is connected in inverse parallel with the transistor 211, and the diode 216 is connected in inverse parallel with the transistor 212. The diodes 215, 216 are provided for allowing a current to flow by bypassing the transistors 211, 212 when they are in an off state.

The reactor 213 has one end thereof connected to a midpoint of the series connection of the transistors 211, 212, and has another end thereof connected to a battery-side positive electrode terminal 201 of the bidirectional converter circuit 21. The capacitor 214 is connected between the battery-side positive electrode terminal 201 and a battery-side negative electrode terminal 202 of the bidirectional convener circuit 21. The battery-side negative electrode terminal 202 and the inverter-side negative electrode terminal 204 of the bidirectional converter circuit 21 are directly connected.

The transistor 211 on positive electrode's side Of the series connection is mainly involved in a stepping-down operation, while the transistor 212 on negative electrode's side of the series connection is mainly involved in a boosting operation. The circuit configuration and operation of the bidirectional converter circuit 21 in FIG. 1 are well known, so detailed description thereof will be omitted.

The capacitor 214 serves to temporarily store electric energy in the bidirectional converter circuit 21. The capacitor 23 that smooths a current transmitted from the main battery 11 is connected in parallel between the bidirectional converter circuit 21 and the inverter circuit 22. As illustrated in FIG. 1, the capacitors 214, 23 are connected between a positive electrode and a negative electrode of the main battery 11 via the system main relay 12.

The system main relay 12 is a switch that switches between connection and disconnection between the power converter 20 and the main battery 11. The system main relay 12 is controlled by the controller 13 of the power source system 10. When the main switch 41 of the vehicle is turned on, the controller 13 switches the system main relay 12 from an open state to a connected state after pre-charging the capacitors 214, 23 (to be described later) and connects the power converter 20 to the main battery 11. Dotted-line arrows in FIG. 1 represent signal lines. The auxiliary devices 30, such as the controller 13 of the power source system 10, the engine controller 32, the air conditioner 33, and the car navigation system 34, are capable of communicating with each other by an in-vehicle network 35.

The boost converter 14 has a low voltage terminal 142 thereof connected to the auxiliary battery 15 and a high voltage terminal 141 thereof connected to the power converter 20 on a side closer to the power converter 20 relative to the system main relay 12. In other words, the high voltage terminal 141 of the boost converter 14 is connected to the power converter 20 without interposing the system main relay 12. The boost converter 14 can boost the output voltage of the auxiliary battery 15 and supply it to the power converter 20 (the capacitors 214, 23).

The controller 13 controls the system main relay 12 and the boost converter 14. The controller 13 includes a CPU 131 and a memory 132, and can execute various processes by the CPU 131 executing a program stored in the memory 132. The power source system 10 includes a voltage sensor 17 that measures a voltage of the auxiliary battery 15 and a current sensor 16 that measures a current of the auxiliary battery 15. Data of these sensors is sent to the controller 13. Although not illustrated, a voltage sensor is also connected between the battery-side positive electrode terminal 201 and the battery-side negative electrode terminal 202 of the bidirectional converter circuit 21, and measurement data of this voltage sensor is also sent to the controller 13. The voltage sensor between the positive electrode terminal 201 and the negative electrode terminal 202 measures a voltage across each of the capacitors 214, 23 in a pre-charging process to be described later.

As is understood from the block diagram in FIG. 1, when the system main relay 12 is switched from the open state to the connected state, the power converter 20 is connected to the main battery 11, and a current of the main battery 11 flows into the capacitors 214, 23 of the power converter 20. Even when the transistor 211 is off, the current of the main battery 11 flows into the capacitor 23 through the diode 215. When the system main relay 12 is switched to the connected state in a state where the capacitors 214, 23 are completely discharged, the current of the main battery 11 suddenly flows into the capacitors 214, 23 through the system main relay 12. The flow of large current through the system main relay 12 may cause contact melting of the system main relay 12. Thus, when the main switch 41 is turned on, the controller 13 charges the capacitors 214, 23 in advance by using the auxiliary battery 15 and the boost converter 14 prior to switching the system main relay 12 from the open state to the connected state. Charging the capacitors 214, 23 before switching the system main relay 12 to the connected state is referred to as pre-charging.

Charging the capacitors 214, 23 requires an appropriate amount of power. Moreover, after the turn-on of the main switch 41 of the vehicle, the system main relay 12 cannot be switched to the connected state unless the pre-charging has been completed. It is therefore desirable that the pre-charging is completed in a short time.

Meanwhile, the auxiliary battery 15 has various auxiliary devices connected thereto. As mentioned above, FIG. 1 depicts the controller 13 of the power source system 10, the engine controller 32, the air conditioner 33, and the car navigation system 34, as the auxiliary devices 30. Although not illustrated, an electric-powered shift device, an electronically controlled brake device, a room lamp, a car audio system, a seat heater, a wiper, a rear defogger, and the like are also supplied with power from the auxiliary battery 15, as auxiliary devices.

Some of the auxiliary devices 30 may be restricted or prohibited from operating for a certain period after the turn-on of the main switch 41 of the vehicle. In other words, some of the auxiliary devices 30 may reduce consumption power thereof for a certain period after the turn-on of the main switch 41 of the vehicle. For example, the auxiliary devices such as the air conditioner 33 and the seat heater may reduce maximum output thereof to an intermediate level. The car navigation system 34, the rear defogger, and the wiper may prohibit their activation. The auxiliary devices 30 whose consumption power may be reduced for a certain period after the turn-on of the main switch 41 of the vehicle will hereinafter be referred to as the normal auxiliary devices 30b.

On the other hand, some other auxiliary devices 30, such as the controller 13 of the power source system 10, the engine controller 32, the electric-powered shift device, and the electronically controlled brake device, cannot prohibit their operations immediately after the turn-on of the main switch 41 of the vehicle. The auxiliary devices 30 whose operations cannot be prohibited will hereinafter be referred to as the special auxiliary devices 30a, In the power source system 10 of the embodiment, the normal auxiliary devices 30b are registered in advance in the memory 132 of the controller 13.

To complete the pre-charging within a short time, a large current may be supplied from the boost converter 14 to the capacitors 214, 23. However, if consumption power of the boost converter 14 is increased, power from the auxiliary battery 15 may become insufficient, which may result in unstable operation(s) of operating auxiliary devices 30 or of the boost converter 14. Thus, the controller 13 of the power source system 10 of the embodiment specifies a relationship between a current and a voltage of the auxiliary battery 15 before the pre-charging and controls the boost converter 14 based on the relationship such that power from the auxiliary battery 15 does not become insufficient. The controller 13 of the present embodiment determines a consumption current of the boost converter 14 (i.e., an output current target of the boost converter 14) such that power from the auxiliary battery 15 does not become insufficient.

Figure 2:
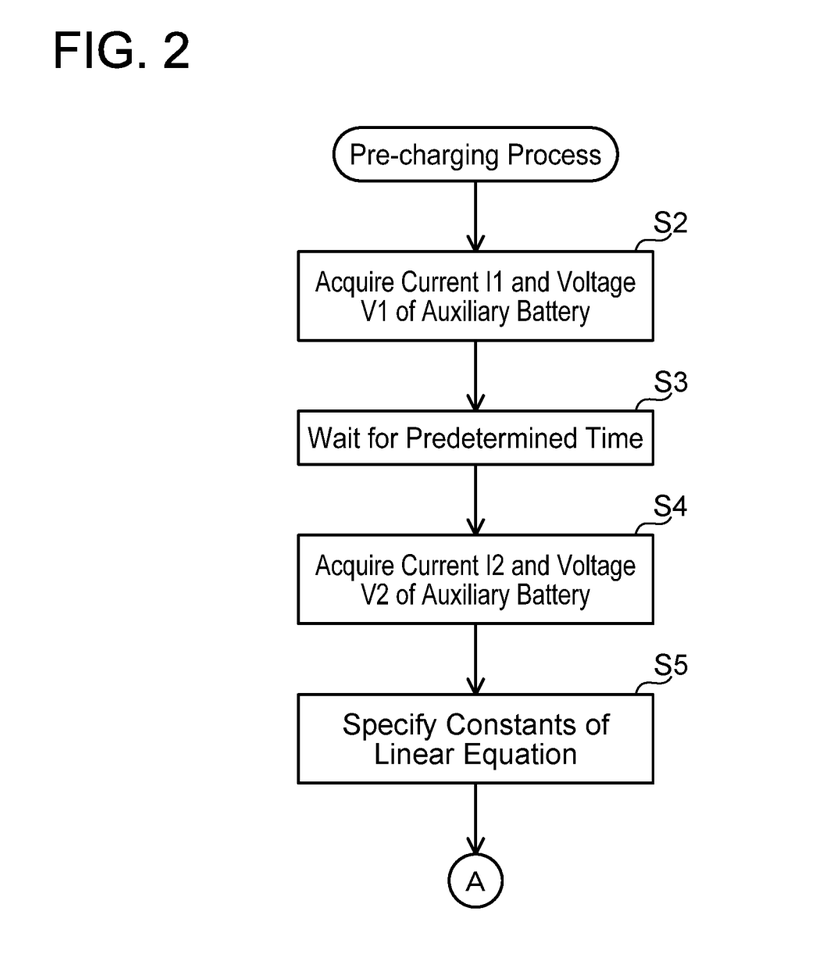
FIG. 2 is a flow chart (1) of a pre-charging process executed by a controller.
Figure 3:
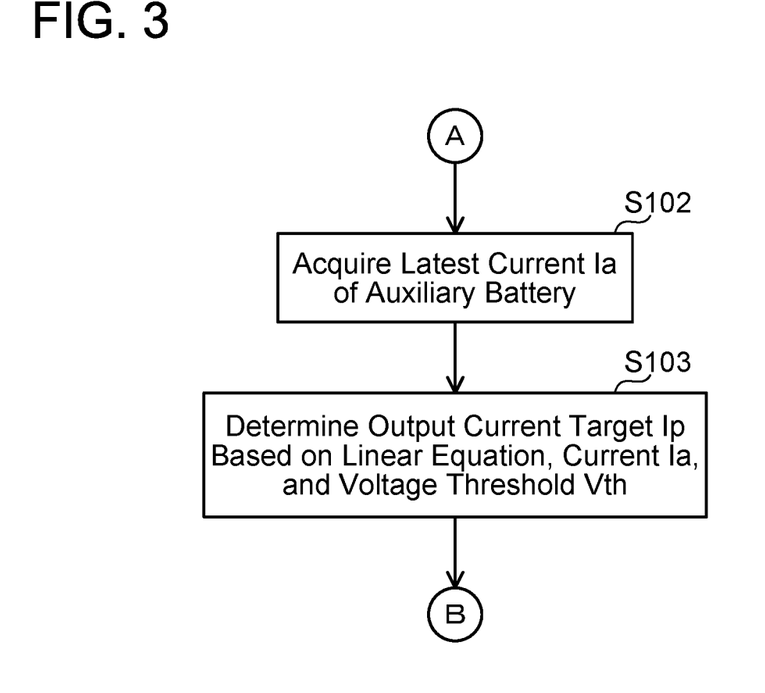
FIG. 3 is a flow chart (2) of the pre-charging process executed by the controller.
Figure 4:
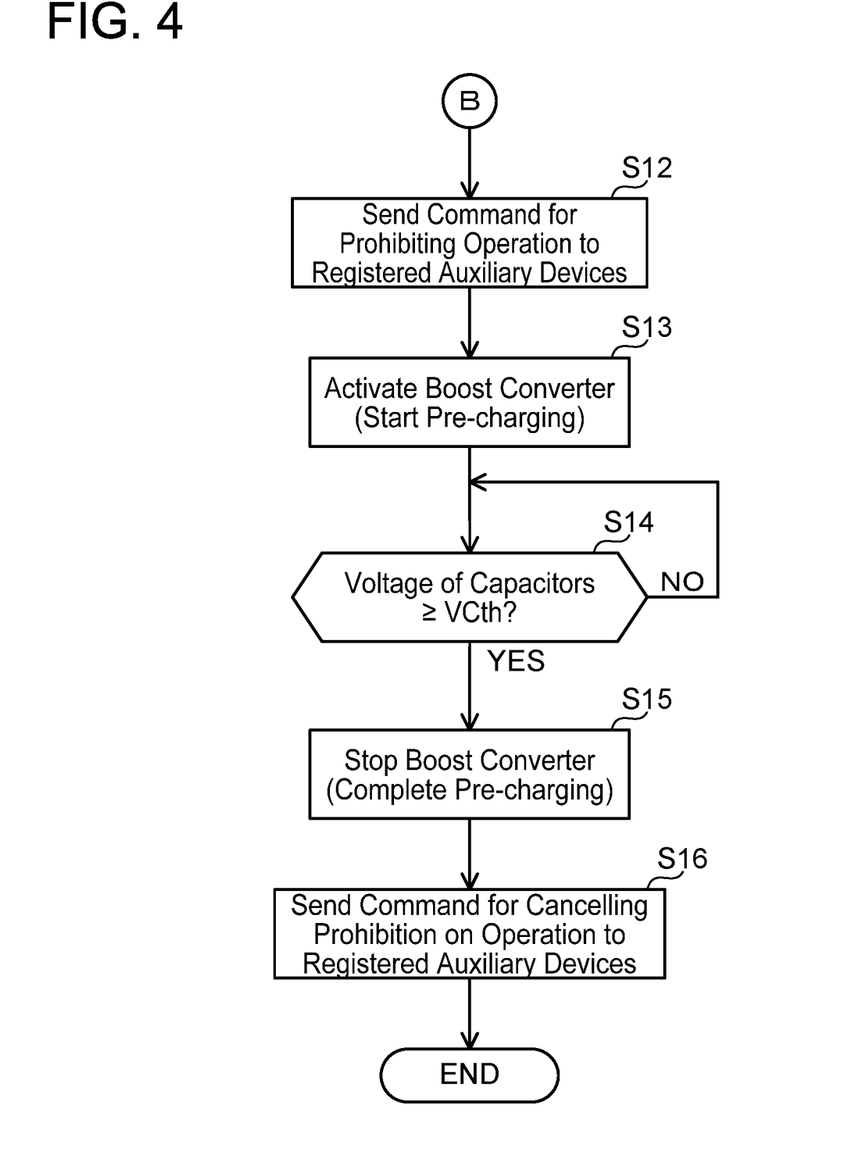
FIG. 4 is a flow chart (3) of the pre-charging process executed by the controller.

With reference to FIGS. 2 to 5, the pre-charging process executed by the controller 13 will be described. FIGS. 2 to 4 are flow charts of the pre-charging process. The process in FIGS. 2 to 4 is started when the main switch 41 of the vehicle is turned on. Before starting the pre-charging, the controller 13 specifies, based on pairs of the current and the voltage of the auxiliary battery 15 at two different times, a relationship between the current and the voltage as a linear equation. Firstly, the controller 13 acquires data of a current I1 and a voltage V1 of the auxiliary battery 15 (step S2). The current and the voltage of the auxiliary battery 15 can be acquired from the current sensor 16 and the voltage sensor 17.

Next, the controller 13 waits for a predetermined time (step S3) and then acquires data of a current I2 and a voltage V2 of the auxiliary battery 15 (step S4). The predetermined time may be, for example, 30 seconds. The predetermined time is provided between the first data acquisition and the second data acquisition to acquire different pairs of data at two different times, due to operational state changes of operating auxiliary devices between these two different times. For example, the electric-powered shift device operates an actuator for zero-point reset of a shift lever when the main switch 41 is turned on. Moreover, the electronically controlled brake system accumulates reserve pressure in an accumulator when the main switch 41 is turned on. As such, when the main switch 41 is turned on, some of the auxiliary devices execute their initializing processes that involve operation of the actuator, so the output current of the auxiliary battery 15 changes. With the predetermined time provided between the first data acquisition and the second data acquisition, two different pairs of data can be acquired. The two pairs of data at different times are, in other words, data of chronological changes of the current and the voltage of the auxiliary battery 15.

The controller 13 specifies the relationship between the current and the voltage of the auxiliary battery 15 as a linear equation based on the two pairs of chronological change data (step S5). As is well known, with two pairs of data representing index (voltage) on an ordinate axis and index (current) on an abscissa axis, a line that passes through the two points can be determined. The relationship between a current I and a voltage V of the auxiliary battery 15 is represented by a line as $V = Ca \times I + Cb$. Here, each of Ca, Cb is a constant. To specify the relationship between the current I and the voltage V as a linear equation, the constants Ca, Cb need to be determined. Based on the two pairs of chronological change data (V1, I1) and (V2, I2), the constants Ca, Cb can be determined.

Next, the controller 13 acquires a latest current Ia of the auxiliary battery 15 immediately before the pre-charging (step S102). Since the relationship between the current and the voltage has been specified, the current Ia may be determined after a latest voltage Va of the auxiliary battery 15 is acquired based on the linear equation that has been specified. A minimum output voltage of the auxiliary battery 15 with which unstable operations of the operating auxiliary devices 30 can be avoided is referred to as a voltage threshold Vth. The controller 13 determines an output current target Ip of the boost converter 14 based on the latest current Ia of the auxiliary battery 15, the voltage threshold Vth, and the determined linear equation (step S103).

An algorithm for determining the output current target Ip will be described. When the boost converter 14 achieves the output current target Ip, the current of the auxiliary battery 15 becomes (Ia+Ip). The voltage of the auxiliary battery 15 needs not to fall below the voltage threshold Vth when the auxiliary battery 15 outputs this current (Ia+Ip), and hence the determined linear equation yields a relational expression $Vth \leq Ca\,(Ia+Ip)+Cb$. Under the condition that the voltage of the auxiliary battery 15 does not fall below the voltage threshold Vth, a maximum output of the boost converter 14 is $Ip = (Vth - Cb)/Ca - Ia$. This current value Ip is the output current target Ip to be given to the boost converter 14 by the controller 13.

Figure 5:
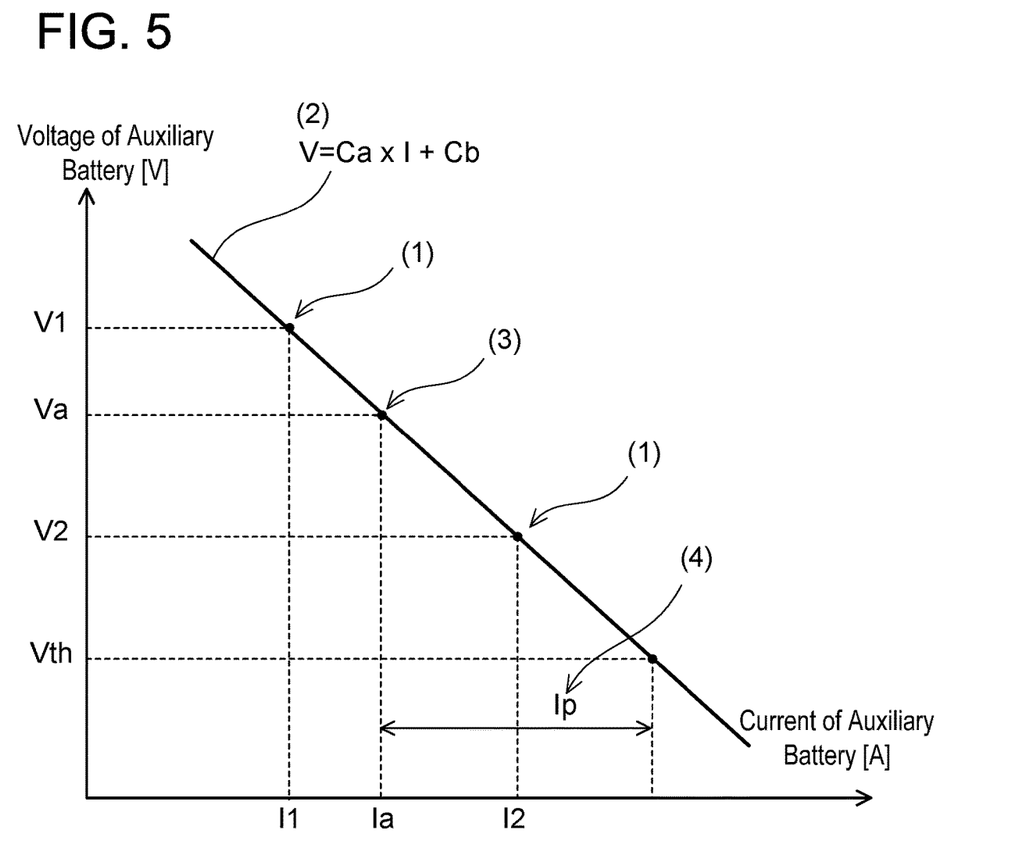
FIG. 5 is a diagram for describing an algorithm for determining an output current target.

With reference to a graph in FIG. 5, the algorithm for determining the relationship between the current and the voltage of the auxiliary battery 15 and then determining the output current target Ip will be described again. In steps S2 and S4, the pairs of data (I1, V1), (I2, V2) of chronological changes of the current and the voltage of the auxiliary battery 15 are acquired ((1) in FIG. 5). Based on the two pairs of data (I1, V1), (I2, V2), the constants Ca, Cb in the linear equation $V = Ca \times I + Cb$ are determined ((2) in FIG. 5). The controller 13 acquires the latest current Ia of the auxiliary battery 15 ((3) in FIG. 5). Based on the linear equation, the current Ia, and the voltage threshold Vth, the output current target $Ip = (Vth - Cb)/Ca - Ia$, with which the voltage of the auxiliary battery 15 does not fall below the voltage threshold Vth, is determined ((4) in FIG. 5).

With reference to FIG. 4, the description of the pre-charging process will be resumed.

When the output current target of the boost converter 14 is determined, the controller 13 sends a command for prohibiting an operation (hereinafter referred to as "operation prohibiting command") to the auxiliary devices (the normal auxiliary devices 30b) registered in the memory 132

(step S12). The operation prohibiting command is sent to the normal auxiliary devices 30b because there is a possibility that the voltage of the auxiliary battery 15 may fall below the voltage threshold Vth if consumption current further increases due to activation of other auxiliary device(s) after the pre-charging is started with the output current target Ip. The operation prohibiting command is sent through the in-vehicle network 35.

The controller 13 activates the boost converter 14 and gives the output current target Ip (step S13). In other words, the controller 13 starts the pre-charging.

The controller 13 continues the charging until the voltage of each of the capacitors 214, 23 reaches a predetermined charging voltage threshold VCth (the step S14: NO). It is desirable that the charging voltage threshold VCth is close to the output voltage of the main battery 11, and the charging voltage threshold VCth is set to, for example, 70% to 95% of the voltage of the main battery 11. As mentioned above, the voltage sensor is connected between the positive electrode terminal 201 and the negative electrode terminal 202 of the bidirectional converter circuit 21, and the controller 13 acquires the voltage of each of the capacitors 214, 23 from this voltage sensor.

When the voltage of each of the capacitors 214, 23 reaches the predetermined charging voltage threshold VCth, the controller 13 stops the boost converter 14 and completes the pre-charging (step S14: YES, step S15). The controller 13 sends a command for cancelling the prohibition on an operation (hereinafter referred to as "operation prohibition cancelling command") to the normal auxiliary devices 30b (the auxiliary devices registered in the memory 132) to which the operation prohibiting command was sent previously (step S16). The operation prohibition cancelling command is also sent through the in-vehicle network 35. The pre-charging process is hereby completed.

After completing the pre-charging process, the controller 13 switches the system main relay 12 to the connected state and connects the power converter 20 to the main battery 11. When the power converter 20 is connected to the main battery 11, the hybrid vehicle 100 becomes ready to travel.

Since the capacitors 214, 23 are charged by the pre-charging, no large inrush current flows when the system main relay 12 is switched to the connected state.

The controller 13 specifies the relationship between the voltage and the current of the auxiliary battery 15 as the linear equation prior to the pre-charging and controls the boost converter by using the relationship. Specifically, the controller 13 acquires the latest current Ia of the auxiliary battery 15, and determines the output current target Ip with which the voltage of the auxiliary battery 15 does not fall below the voltage threshold Vth based on the current Ia, the voltage threshold Vth, and the linear equation. The power source system 10 can complete the pre-charging within a short time without allowing the voltage of the auxiliary battery 15 to fall below the voltage threshold Vth.

(First Variant)

Figure 6:
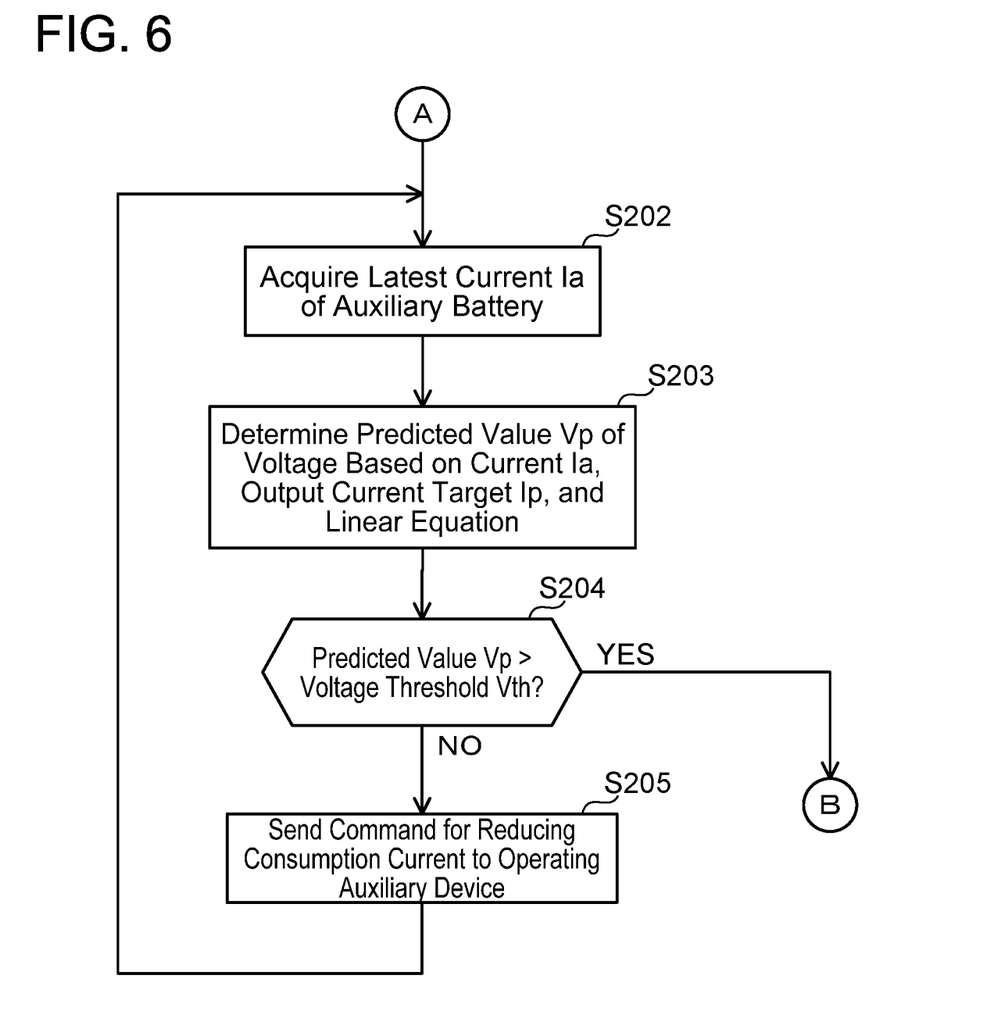
FIG. 6 is a flow chart of a pre-charging process of a first variant.

Next, with reference to FIG. 6, a pre-charging process of a first variant will be described. In the pre-charging process of the first variant, a flow chart of FIG. 6 replaces the flow chart of FIG. 3 among the flow charts in FIGS. 2 to 4. In other words, the pre-charging process of the first variant is same as the pre-charging process of the embodiment in steps S2 to S5 (FIG. 2) and steps S12 to S16 (FIG. 4).

In the pre-charging process of the first variant, the output current target Ip to be given to the boost converter 14 is predetermined. After determining the linear equation that represents the relationship between the current I and the voltage V of the auxiliary battery 15 (FIG. 2, steps S2 to S5), the controller 13 acquires the latest current Ia of the auxiliary battery 15 immediately before the pre-charging (FIG. 6, step S202). The Controller 13 may acquire the latest voltage Va from the voltage sensor 17 and then acquire the latest current Ia based on the voltage Va and the linear equation.

Next, the controller 13 determines a predicted value Vp of the voltage of the auxiliary battery 15 based on the acquired current Ia, the predetermined output current target Ip, and the determined linear equation (step S203). Based on the linear equation, the predicted value Vp is acquired by an equation $Vp = Ca \times (Ia + Ip) + Cb$.

If the predicted value Vp exceeds the voltage threshold Vth, the controller 13 starts the pre-charging by using the predetermined output current target Ip (step S204: YES, proceeding to the process of FIG. 4). The subsequent process is the same as that in the pre-charging process of the embodiment.

If the predicted value Vp is lower than the voltage threshold Vth (step S204: NO), the controller 13 communicates with the auxiliary devices 30 (the normal auxiliary devices 30b) registered in the memory 132. If any of the auxiliary devices 30 is operating, the controller 13 sends a command for reducing consumption power (hereinbelow referred to as "consumption power reducing command") to one of these auxiliary devices 30 (step S205). In a case where the auxiliary device 30 that has received the command is the air conditioner 33 or the seat heater, the air conditioner 33 or the seat heater that has received the command reduces its output. In a case where the auxiliary device 30 that has received the command is the car navigation system 34, the car navigation system stops.

After step S205, the controller 13 returns to the process of step S202 and reacquires the latest current Ia of the auxiliary battery 15. Since one of the auxiliary devices 30 (the normal auxiliary devices 30b) has reduced the consumption power thereof, the current Ia acquired this time is smaller than the previous value. The controller 13 redetermines the predicted value Vp of the voltage of the auxiliary battery 15, based on the latest current Ia, the output current target Ip, and the determined linear equation (step S203). The controller 13 then compares the predicted value Vp with the voltage threshold Vth (step S204). The controller 13 repeats steps S202 to S205 until the predicted value Vp exceeds the voltage threshold Vth. When the predicted value Vp exceeds the voltage threshold Vth, the controller 13 shifts to the process of step S12 in FIG. 4.

The pre-charging process of the first variant has an advantage that the predetermined, desirable output current target Ip can be achieved without allowing the voltage of the auxiliary battery 15 to fall below the voltage threshold Vth.

(Second Variant)

Next, with reference to FIG. 7, a pre-charging process of a second variant will be described. The pre-charging process of the second variant is also same as the pre-charging process of the embodiment in steps S2 to S5 (FIG. 2) and steps S12 to S16 (FIG. 4). In the pre-charging process of the second variant, a flow chart of FIG. 7 replaces the flow chart of FIG. 3, among the flow charts of FIGS. 2 to 4.

The pre-charging process of the second variant includes features of the pre-charging process of the embodiment and features of the pre-charging process of the first variant. In the pre-charging process of the second variant as well, the output current target Ip to be given to the boost converter 14 is predetermined. It should be noted that the output current target Ip is lowered when there is no more normal auxiliary device 30b whose consumption power can be reduced.

Figure 7:
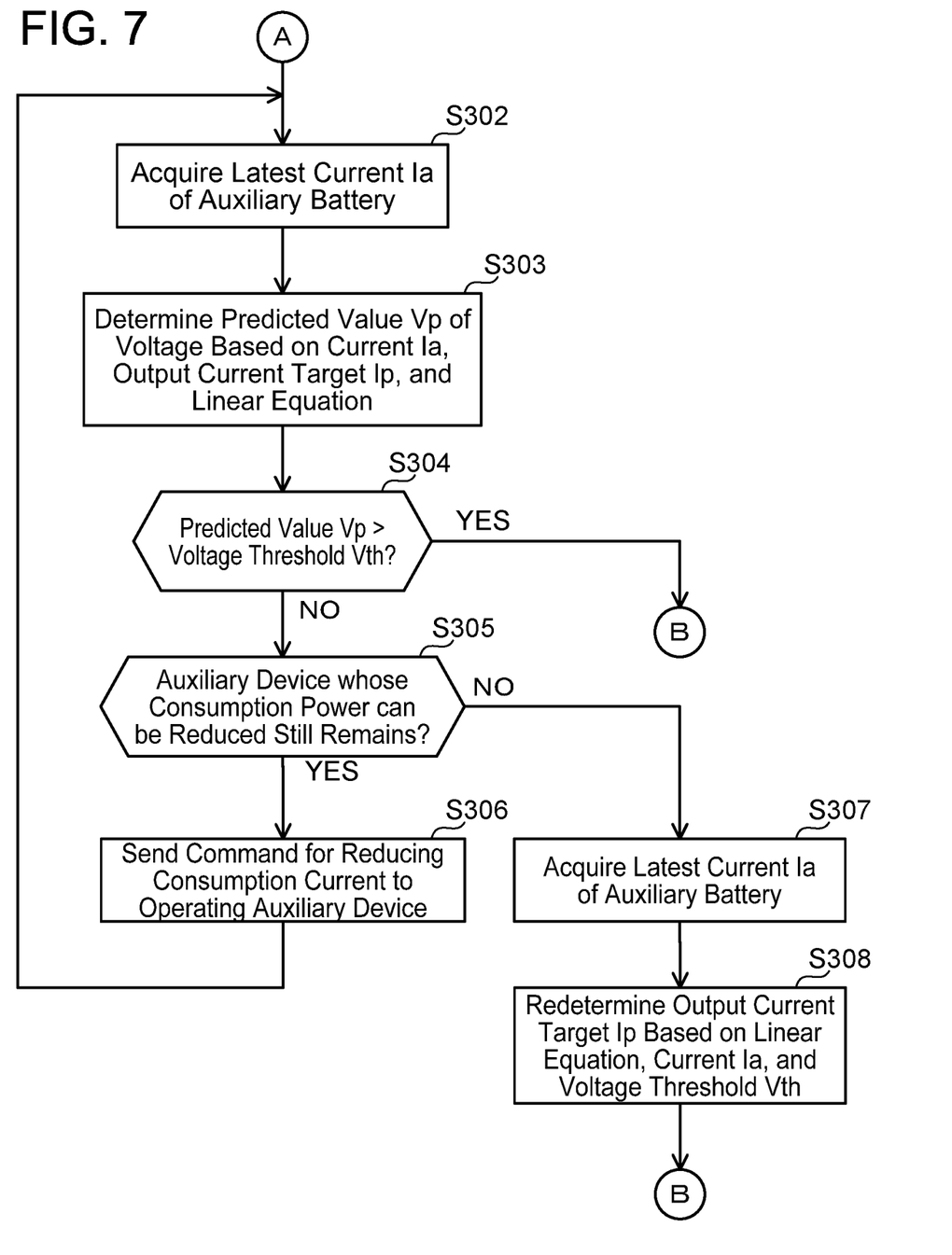
FIG. 7 is a flow chart of a pre-charging process of a second variant.

After determining the linear equation that represents the relationship between the current I and the voltage V of the auxiliary battery 15 (FIG. 2, steps S2 to S5), the controller 13 acquires the latest current Ia of the auxiliary battery 15 immediately before the pre-charging (FIG. 7, step S302). Next, the controller 13 determines the predicted value Vp of the voltage of the auxiliary battery 15 based on the acquired current Ia, the predetermined output current target Ip, and the determined linear equation (a step S303). Based on the linear equation, the predicted value Vp is acquired by an equation $Vp=Ca \times (Ia+Ip)+Cb$.

If the predicted value Vp exceeds the voltage threshold Vth, the controller 13 starts the pre-charging by using the predetermined output current target Ip (step S304: YES, proceeding to the process of FIG. 4). The subsequent process is the same as that of the pre-charging process of the embodiment.

If the predicted value Vp is lower than the voltage threshold Vth (step S304: NO), the controller 13 communicates with the auxiliary devices (the normal auxiliary devices 30b) registered in the memory 132 and checks whether or not the auxiliary devices that are operating still remain (step S305). If the auxiliary devices that are operating still remain (step S305: YES), the controller 13 sends the consumption power reducing command to one of these auxiliary devices 30 (step S306). The process is then repeated from step S302. The processes of steps 302, 303, 304 and 306 are the same respectively as those of steps 202, 203, 204 and 205 of the first variant.

If there is no auxiliary device that is operating (step S305: NO), the controller 13 reacquires the latest current Ia of the auxiliary battery 15 (step S307). In step S308, the controller 13 then redetermines (adjusts) the output current target Ip based on the current Ia acquired this time, the voltage threshold Vth, and the linear equation such that the voltage of the auxiliary battery 15 when the boost converter 14 is operated does not fall below the voltage threshold Vth. The processes of steps S307, S308 are the same as those of the embodiment (FIG. 3, steps S102, S103).

In the pre-charging process of the second variant, it is attempted to achieve the predetermined output current Ip by reducing the consumption power of the other auxiliary devices (the normal auxiliary devices 30b) as much as possible. When there is no auxiliary device whose consumption current is to be reduced, the output current target Ip is lowered such that the voltage of the auxiliary battery 15 does not fall below the voltage threshold Vth even when the pre-charging is started.

The power source system 10 described in the embodiment has features as follows. The power source system 10 includes the main battery 11, the power converter 20, the system main relay 12, the auxiliary battery 15, the boost converter 14, and the controller 13, The power converter 20 includes the capacitors 214, 23 connected to the main battery 11 via the system main relay 12. The boost converter 14 has the low voltage terminal 142 thereof connected to the auxiliary battery 15, and the high voltage terminal 141 thereof connected to the power converter 20 without interposing the system main relay 12. In other words, the high voltage terminal 141 of the boost converter 14 is connected to the capacitors 214, 23 of the power converter 20 without interposing the system main relay 12.

When the main switch 41 of the vehicle is turned on, the controller 13 charges the capacitors 214, 23 by activating the boost converter 14 prior to switching the system main relay 12 to the connected state and connecting the power converter 20 to the main battery 11. The controller 13 acquires the data of chronological changes of the voltage and the current of the auxiliary battery 15 and specifies the relationship between the voltage and the current of the auxiliary battery based on the data. The controller 13 controls the boost converter 14 based on the specified relationship such that the voltage of the auxiliary battery 15 does not fall below the predetermined voltage threshold Vth. A typical example of the relationship between the voltage and the current of the auxiliary battery 15 is a linear equation determined based on chronological data at two different times.

An embodiment of the controller 13 is configured to determine the output current target Ip to be given to the boost converter 14 based on the current Ia of the auxiliary battery 15 immediately before the activation of the boost converter 14, the voltage threshold Vth, and the relationship above, such that the voltage of the auxiliary battery 15 after the activation of the boost converter 14 does not fall below the voltage threshold Vth. The power source system 10 of the embodiment can complete the pre-charging within a short time without allowing the voltage of the auxiliary battery 15 to fall below the voltage threshold Vth. In other words, the power source system 10 can stably execute the pre-charging by using the auxiliary battery 15 to which various auxiliary devices are connected.

In another embodiment of the controller, the output current target Ip to be given to the boost converter 14 is predetermined. The controller 13 specifies the predicted value Vp of the voltage of the auxiliary battery 15 with respect to the output current target Ip based on the current Ia of the auxiliary battery 15 immediately before the activation of the boost converter 14 and the relationship above. If the predicted value Vp is lower than the voltage threshold Vth, the controller 13 outputs the command for reducing consumption power to at least one auxiliary device 30 that is connected to the auxiliary battery 15 and is operating. In this embodiment, since the desirable output current target Ip can be achieved, the pre-charging can be completed within much shorter time without allowing the voltage of the auxiliary battery 15 to fall below the voltage threshold Vth.

Furthermore, the embodiment above and the pre-charging process of the first variant may be combined. In this case, the controller 13 specifies the predicted value Vp of the voltage of the auxiliary battery 15 with respect to the output current target Ip based on the latest current Ia of the auxiliary battery 15 after outputting the command for reducing the consumption power to the at least one auxiliary device and the output current target Ip. If the predicted value Vp is lower than the voltage threshold Vth, the controller 13 adjusts the output current target Ip such that the voltage of the auxiliary battery 15 after the activation of the boost converter 14 does not fall below the voltage threshold Vth based on the current of the auxiliary battery 15, the voltage threshold Vth, and the relationship above.

In this pre-charging process, the consumption power of the at least one auxiliary device is reduced as much as possible, and then the output current target Ip with which the voltage of the auxiliary battery 15 does not fall below the voltage threshold Vth is determined.

Points to be noted relating to the technology described in the embodiment will be described. The main battery 11 corresponds to an example of main power source. The main power source may be a fuel cell. The auxiliary battery 15 corresponds to an example of auxiliary power source.

In the embodiment and the variants, the relationship between the current and the voltage of the auxiliary battery 15 is specified as the linear equation based on the data of chronological changes of the voltage and the current of the auxiliary battery 15. The relationship between the current and the voltage may be specified as a high-degree equation based on three or more pairs of data of chronological changes.

The boost converter 14 may be a bidirectional DC-DC converter. In this case, it is possible to charge the auxiliary battery 15 by switching the system main relay 12 to the connected state and then stepping down the power of the main battery 11.

The pre-charging process described in the embodiment may be executed by a plurality of computers that can communicate with each other by an in-vehicle network. In other words, an actual configuration of the controller 13 described in the embodiment may be a plurality of computers connected to be able to communicate with each other by a network.

The vehicle in the embodiment is the hybrid vehicle that includes the traction motor 50 and the engine 51. The power source system for a vehicle disclosed herein can also be applied to a fuel-cell vehicle and an electric vehicle that include no engine.

While specific examples of the present invention have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present invention is not limited to the combinations described at the time the claims are filed. Further, the purpose of the examples illustrated by the present description or drawings is to satisfy multiple objectives simultaneously, and satisfying any one of those objectives gives technical utility to the present invention.

What is claimed is:

1. A power source system for a vehicle comprising:
   a main power source;
   a power converter configured to convert an output power from the main power source, the power converter including a capacitor connected between a positive electrode and a negative electrode of the main power source;
   a relay configured to switch between connection and disconnection between the power converter and the main power source;
   an auxiliary power source having an output voltage lower than an output voltage of the main power source;
   a boost converter having a low voltage terminal thereof connected to the auxiliary power source, the boost converter having a high voltage terminal thereof connected to the power converter without interposing the relay; and
   a controller configured to pre-charge the capacitor by activating the boost converter prior to placing the relay in a connected state, wherein
   an output current target to be given to the boost converter by the controller is predetermined, and
   the controller is configured to:
      acquire data of chronological changes of a voltage and a current of the auxiliary power source;
      specify a relationship between the voltage and the current of the auxiliary power source based on the data;
      control the boost converter based on the relationship such that a voltage of the auxiliary power source does not fall below a predetermined voltage threshold;
      specify a predicted value of a voltage of the auxiliary power source with respect to the output current target based on a current of the auxiliary power source immediately before the activation of the boost converter and the relationship;
      output a command for reducing a consumption power to at least one auxiliary device that is connected to the auxiliary power source and is operating, when the predicted value is lower than the predetermined voltage threshold;
      specify the predicted value of the voltage of the auxiliary power source with respect to the output current target based on a current of the auxiliary power source after outputting the command for reducing the consumption power to the at least one auxiliary device and the output current target; and
      when the predicted value is lower than the predetermined voltage threshold, adjust the output current target to be given to the boost converter such that a voltage of the auxiliary power source after the activation of the boost converter does not fall below the predetermined voltage threshold based on the current of the auxiliary power source, the predetermined voltage threshold, and the relationship.

2. The power source system for the vehicle of claim 1, wherein
   the controller is configured to specify the relationship as a linear equation based on the data including pairs of the current and the voltage of the auxiliary power source at two different times.

* * * * *